April 11, 1961 P. W. GARBO 2,979,390
PROCESS FOR CARRYING OUT ENDOTHERMIC REACTIONS
Filed Nov. 19, 1956
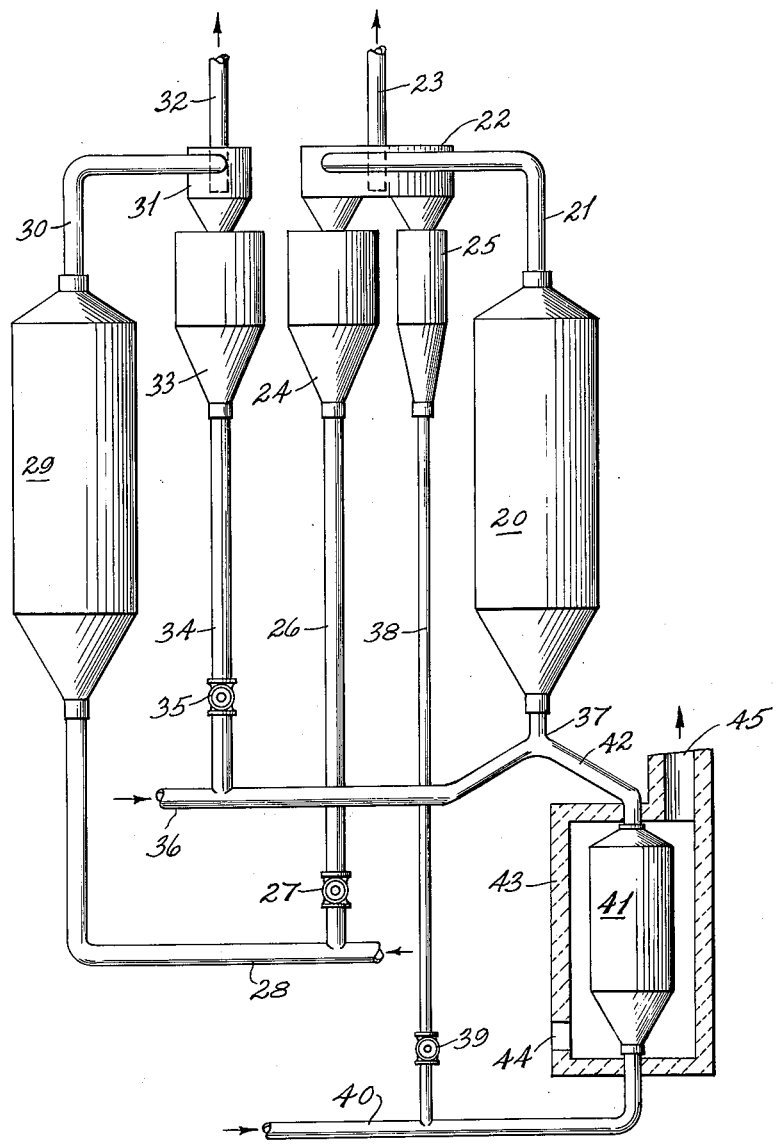
INVENTOR.
PAUL W. GARBO
BY
ATTORNEYS

United States Patent Office 2,979,390
Patented Apr. 11, 1961

2,979,390

PROCESS FOR CARRYING OUT ENDOTHERMIC REACTIONS

Paul W. Garbo, Freeport, N.Y., assignor to Hydrocarbon Research, Inc., New York, N.Y., a corporation of New Jersey Filed Nov. 19, 1956, Ser. No. 623,257

6 Claims. (Cl. 48—202)

The invention relates to improvements in processes wherein gases or vapors are brought into intimate contact with solids in a fluidized state to effect desired conversions, and especially, endothermic reactions in which gases or vapors are contacted with a solid. In one of its more specific aspects, this invention relates to a method of treatment of powdered solid fuels which are fusible or which have constituents which tend to fuse at elevated temperature. The invention is particularly applicable to the carbonization of caking coals, and to the gasification of solid carbonaceous fuels containing a fusible ash.

The technique of reacting solids and gases or vapors has reached a high state of development with the evolution of the art of fluidization of solid particles with gases. According to this technique, gases, which may be reactants, are passed through a bed of finely divided or powdered solids at such velocities that the solids become suspended in the gases but exhibit what has been termed "hindered settling." In practicing fluidization, it is possible to adjust conditions so that a relatively dense mass of powdered solid is maintained within the reaction zone and only a relatively small proportion of the powder is carried out of the reaction zone by the effluent gases. Another view of fluidization is that because of "hindered settling" the solid reactant has a longer residence time in the reactor than the gaseous reactant has. The technique of fluidization, which maintains a mass of powdered material in an agitated state resembling a boiling liquid and which permits the establishment of a pseudo-liquid level between the fluidized mass and the gas space above it, is the basis of the "fluid catalyst" process that has gained eminence in the manufacture of aviation gasoline.

While fluidization is one of the most adaptable procedures for bringing about reactions between solids and gases or vapors, it has a number of inherent disadvantages and limitations. For example, because of the random and turbulent motion of fluidized particles in such masses, the advantages of countercurrent flow of materials to effect the transfer of heat between them are lost. Other principal disadvantages are the relatively large reactors and accessory equipment and the relatively expensive separators, such as cyclones and Cottrell precipitators, which are necessitated when a highly endothermic reaction is involved and powdered solid reactant is depended upon to convey heat to the reaction zone. In other words, a powdered solid reactant in fluidized state is generally not an entirely satisfactory medium for conveying heat.

Several proposals have been set forth by various investigators of the fluidization technique for controlling the temperature of highly endothermic reactions. For instance, in some endothermic processes it has been proposed to increase the rate of flow of the solid and gaseous reactants through the reaction zone and usually also to recycle some of the reaction products after passing them through a suitable heater. This type of suggestion leads to considerable enlargement of the processing equipment and consequently increases costs. Special reactors have been designed so that heat exchange surfaces would be disposed within the fluidized reaction mass to maintain the desired temperature. However, as far as I am aware, these designs have proved impractical because the heat exchange surfaces either interfered with good fluidization or could not be sufficiently distributed throughout the fluidized mass to prevent uneven temperatures. Furthermore, such special reactors are relatively complex and costly.

The gasification of coal wherein coal in a fluidized bed is subjected to reaction with an oxygen-containing gas to produce carbon monoxide is known. The gasification of coal and related solid fuels with steam is a highly endothermic reaction which must be carried out at a high temperature, generally above about 160° F., and preferably above about 2000° F., to ensure commercially practical rates of reaction. Free oxygen may be supplied with the endothermic gaseous reactant to supply by exothermic reaction sufficient heat for the endothermic reactions. Air may be used as a source of free oxygen, in which case the product gas contains a relatively high percentage of nitrogen, which is generally undesirable. To avoid dilution of the product gas with nitrogen, it is generally preferable to supply the necessary heat by burning a portion of the solid fuel with air in the absence of endothermic reactants to raise the temperature of the fuel bed as high as possible without fusion of the solid. When the fuel bed has been thus preheated, the gaseous endothermic reactants are passed into contact with the preheated solid fuel to effect gasification. The gas generation is continued until the temperature falls to a point near the practical minimum, after which the solid is reheated by burning with air as described above.

In fluidized bed operation, it is possible to continuously supply heat to the gas generation zone and continuously conduct gasification with an endothermic reactant. To do this, a portion of the solid in the gasification zone is continuously withdrawn and reheated in a separate heating zone to a temperature above the temperature in the gasification zone by burning with air. The residual hot solids of the combustion are returned to the endothermic reactor at a rate sufficient to maintain the desired reaction temperature. The temperature to which the solid fuel may be reheated is limited by the temperature at which softening of the particles and agglomeration take place. When, for example, a solid carbonaceous material having a fusible ash is processed for the production of gas, the temperature to which the solid may be heated is limited by the fusion temperature of the ash. The present invention avoids this limitation.

In accordance with the present invention, a separable solid thermophore having a higher fusion temperature than that of the carbonaceous material is mixed with the solid carbonaceous material undergoing gasification. The thermophore is preheated to a temperature higher than the fusion temperature of the solid carbonaceous material. The thus preheated thermophore is preferably mixed with the fuel immediately prior to its introduction into the reaction zone. Alternatively, the high temperature thermophore may be separately introduced into the reaction zone and brought into admixture with the fluidized fuel particles undergoing gasification therein. The procedure of this invention has the advantage of minimizing the quantity of solids required in the fluidized bed to effect the desired processing step. When the heated thermophore is mixed with the solid particles of fuel, a finite time is required for the transfer of heat from the thermophore particles to the fuel particles. At the same time, endothermic reactions involving the fuel particles complete for heat and tend to effect a cooling of the particles. It is possible therefore to heat the thermophore to a temperature considerably higher than the temperature of the particles undergoing treatment without encountering fusion in the reaction zone.

The process is particularly suited to the production of gas from carbonaceous fuel by reaction with steam. Similarly, the process may be applied to carbonization of raw coal particles which tend to cake on heating. It is frequently desirable to carbonize a caking coal to remove the vaporizable constituents therefrom and produce a non-caking char suitable as fuel for boilers or for gasification in fluidized bed operation. It has been known heretofore that agglomeration of the fresh fuel particles during carbonization may be avoided by maintaining a relatively low percentage of fresh fuel particles in a fluidized bed of carbonized particles. In such cases, the heat required for carbonization is usually supplied as sensible heat in the fluidizing gas. The present invention provides a method of supplying heat by means of the heated particles of thermophore which in general is more advantageous than supplying all of the heat as sensible heat of the fluidizing gas.

A primary object of my invention is to make the control of temperature within fluidized masses, undergoing endothermic reactions, more flexible and independent.

Another important object is to facilitate greatly the flow of heat to highly endothermic reactions, conducted between reactants in a fluidized state.

Still another object is to simplify the equipment for conducting fluidized endothermic reactions and to reduce its size.

Other objects of my invention will be apparent in the description which follows.

According to my invention, endothermic reactions between comminuted solids and gases or vapors, conducted in a fluidized state, are brought under more accurate temperature control by the use of an additional inert comminuted solid the principal function of which is to carry heat, and which is readily separable from the comminuted solids participating in the reaction. To make quick separation possible, the physical characteristics of the heat-carrying solid, so-called thermophore, differ so from those of the reaction solids that it will pass through the reaction zone admixed with the reaction solids but become segregated when the mixture is subjected to a physical influence to which the thermophore and reaction solids are differently responsive. Separation of thermophore and reaction solids may be accomplished through magnetism, electrostatic charges, density differences, etc. In the present invention the separation is accomplished by subjecting the mixture of thermophore and reaction solids to the action of a field of force in the form of a magnetic or electrostatic field.

The desired reaction between powdered solid and gas is conducted in accordance with the fluidization technique, while superimposed upon this system is the cyclic flow of thermophore as fluidized powder. A powdered thermophore may be fluidized together with the reaction solids and the mixture on leaving the reaction zone may be passed through a magnetic, electrostatic or other suitable separator to segregate the thermophore and reaction solids. The powdered thermophore is heated and recirculated through the fluid reaction zone.

This application is a continuation-in-part of my copending application Serial No. 266,133, filed January 12, 1952, and now abandoned, which is a continuation-in-part of my application Serial No. 40, filed January 2, 1948, which matured in U.S. Patent 2,582,246 and was divided out of my application Serial No. 552,977, filed September 7, 1944, now abandoned.

As a specific application of my invention to an endothermic process may be cited the carbonization and gasification of coal. Pulverized coal, e.g., one passing through a 60-mesh screen and having about a 60% fraction retained on a 140-mesh screen and about a 25% fraction passing through a 325-mesh screen, is carried in suspension by a stream of coal gas into the reactor wherein fluidization occurs. Carbonization of coal is well known. Similarly, endothermic gasification of solid fuel, for example, by reaction with steam, carbon dioxide, or a mixture of steam and carbon dioxide, is well known. It is also known that such endothermic gasification of solid fuels may be effected in a fluidized bed and that heat may be supplied to the fluidized bed by withdrawing solids from the fluidized bed, passing the withdrawn solids through a burning zone, and returning hot residual solids from the burning zone to the fluidized bed to introduce heat thereinto. When a solid carbonaceous material having a fusible ash is processed for the production of gas in the conventional manner in a fluidized bed, the temperature of the solid withdrawn from the burning zone is limited by the fusion temperature of the ash. My invention avoids this limitation by providing a method of separating a thermophore from solids containing ash and heating the separated thermophore to a temperature higher than the fusion temperature of the ash. This has the advantage of minimizing the quantity of heat carrying solids required in the fluidized bed to effect the desired processing of the fluidized material.

Referring to the figure, my invention, which involves the use of a fluidizable and readily separable thermophore, is explained in terms of gasification of solid fuel. In reactor 20 is a mixture of particles of fuel and readily separable thermophore fluidized by the passage of gases upwardly through the reactor. The gas velocity is such that the mixed particles of solids are continuously withdrawn from the reactor 20 by entrainment in the effluent gases. The product gases and suspended solids flow through pipe 21 into separator 22 wherein, because of different physical susceptibilities, the thermophore and fuel particles are separated from each other and from the product gases which flow through pipe 23. The separated fuel and thermophore particles drop into hoppers 24 and 25, respectively. The fuel particles travel down standpipe 26 and through valve 27 into pipe 28 through which air is flowing. Fuel particles suspended in air enter zone 29 and therein the fuel, in a fluidized condition, is subjected to combustion. Flue gases carrying heated particles of fuel flow through pipe 30 into a cycle separator 31. The flue gases are vented through pipe 32 while the separated fuel particles drop into hopper 33. The heated fuel particles move down standpipe 34 and through valve 35 into pipe 36. Gaseous reactant passing through pipe 36 conveys the fuel particles in suspension through inlet pipe 37 of reactor 20.

The thermophore particles in hopper 25 run down standpipe 38 and through valve 39 into pipe 40. A conveying gas injected through pipe 40 takes the thermophore into heater vessel 41 wherein, in a fluidized state, the thermophore is raised to a desired temperature. The heated thermophore and conveying gas travel through pipes 42 and 37 and become thoroughly commingled in reactor 20 with the incoming stream of fuel particles and gaseous reactant. The thermophore is heated to a temperature higher than the fusion temperature of the ash, or residue, from the fuel and is introduced at said higher temperature into admixture with the fuel particles entering reactor 20 through pipe 37. The stream of hot thermophore provides supplementary heat for the endothermic reaction. Because of the high turbulence in a fluidized mass, the thermophore particles are quickly dispersed throughout the mass of fuel particles with the result that even though the thermophore particles are initially at a temperature above the fusion point of the fuel ash, there is very rapid equalization of temperature and none of the fuel or ash agglomerates. A furnace setting 43 (shown in vertical section) surrounds heater vessel 41. Opening 44 is for the introduction of a combustible mixture like fuel oil and air, and stack 45 provides a vent for the flue gases.

Several modifications will be apparent to those skilled in the art. For example, the furnace setting 43 may be omitted and a combustible mixture, like oxygen and methane, may be introduced into heater 41 so that the thermophore in a fluid condition is raised to the desired temperature by internal combustion. In this case, the flue gases act as the suspending and conveying medium for the transfer of hot thermophore from heater 41 to reactor 20.

The thermophore is preferably a material which is high in both specific gravity and specific heat. Good thermal conductivity is another factor to be considered in the selection of a thermophore. Prominent among the materials that may be employed as thermophores are silicon carbide, iron, aluminum, fused alumina, periclase, glass, sand, magnetite, graphite, and halides of alkali metals. In selecting a thermophore, the reaction and the attendant conditions to which the thermophore will be exposed must be considered.

Those skilled in the art will visualize many commutations and permutations of the elements of my invention. Such modifications conforming to the spirit of the invention are to be considered within the scope of the claims.

I claim:

1. In an endothermic process of producing a combustible gas from a solid carbonaceous material containing a fusible ash, wherein said carbonaceous material in comminuted form is treated while undergoing fluidization in a conversion zone to effect the desired conversion at a high-temperature below the fusion temperature of said ash, the improvement in supplying heat to said endothermic process and effecting said conversion at said high temperature below the fusion temperature of said ash which comprises simultaneously passing through said conversion zone a particulate inert solid thermophore which is at a temperature higher than the fusion temperature of the ash in said carbonaceous material when said thermophore is introduced into said conversion zone.

2. The process of claim 1 wherein the solid carbonaceous material is coal.

3. In an endothermic process of producing a combustible gas from a solid carbonaceous material containing a fusible ash, wherein said carbonaceous material in comminuted form is treated while undergoing fluidization in a conversion zone to effect the desired conversion at a high-temperature below the fusion temperature of said ash, the improvement in supplying heat to said endothermic process and effecting said conversion at said high temperature below the fusion temperature of said ash which comprises simultaneously passing through said conversion zone a particulate inert solid thermophore at a temperature higher than the fusion temperature of said ash when said thermophore is introduced into said conversion zone; discharging from said conversion zone a mixture of said carbonaceous material, ash and thermophore; separating said thermophore from the discharged mixture; heating the separated thermophore to a temperature higher than the fusion temperature of said ash, and reintroducing the thus heated thermophore at substantially said higher temperature into said conversion zone.

4. The process of claim 3 wherein the separation of said thermophore from the discharged mixture is effected under the influence of an electrostatic field.

5. The process of claim 3 wherein the separation of said thermophore from the discharged mixture is effected under the influence of a magnetic field.

6. The process of claim 3 wherein the solid carbonaceous material is coal.

References Cited in the file of this patent

UNITED STATES PATENTS

| | | |
|---|---|---|
| 1,698,345 | Puening | Jan. 8, 1928 |
| 2,579,398 | Roetheli | Dec. 18, 1951 |
| 2,602,809 | Dickerson | July 8, 1952 |
| 2,659,668 | Mayland | Nov. 17, 1953 |

OTHER REFERENCES

Low Temperature Carbonization of Bituminous Coal, McCulloch and Simpson, pages 59 to 61.

UNITED STATES PATENT OFFICE
CERTIFICATION OF CORRECTION

Patent No. 2,979,390                                          April 11, 1961

Paul W. Garbo

It is hereby certified that error appears in the above numbered patent requiring correction and that the said Letters Patent should read as corrected below.

Column 2, line 14, for "160° F." read -- 1600° F. --; line 69, for "complete" read -- compete --.

Signed and sealed this 29th day of August 1961.

(SEAL)
Attest:

ERNEST W. SWIDER                                          DAVID L. LADD
Attesting Officer                                            Commissioner of Patents